Patented Nov. 18, 1952

2,618,663

UNITED STATES PATENT OFFICE 2,618,663

PRODUCTION OF POLYETHER ALCOHOLS

Samuel Arthur Glickman, Easton, Pa., assignor to General Aniline & Film Corporation, New York, N. Y., a corporation of Delaware No Drawing. Application January 17, 1951, Serial No. 206,519

4 Claims. (Cl. 260—615)

This invention relates to an improved process for producing polyether alcohols by simultaneous hydrolysis and reduction of polyetheralkanal acetals. Polyether alkanal acetals of the type indicated in the equation given below are readily obtained by the reaction of vinyl ethers with acetals as described in Mueller-Cunradi U. S. P 2,165,962 and Copenhaver U. S. P. 2,487,525.

It is suggested in this U. S. P. 2,165,962 that ether acetals can be simultaneously hydrolyzed and hydrogenated to convert them to ether alcohols. Thus, this Mueller-Cunradi patent suggests adding to β-ethoxy butyraldehyde diethyl acetal 95 parts of water, 62 parts of ethyl alcohol, 3 parts of glacial acetic acid and 60 parts of a copper catalyst precipitated on silica gel. The thus formed mixture is heated in a pressure of 200 atmospheres. After four hours, the catalyst is filtered and the reaction mixture distilled in vacuo to obtain ethoxy-3-butanol-1.

This procedure thus requires the use of a very high pressure and, consequently, expensive equipment. In addition, when employing 3,5 diethoxybutyraldehyde dimethyl acetal in place of 3 ethoxybutylaldehyde diethyl acetal and a copper chromite catalyst precipitated on silica gel (of German origin presumably used for acetaldol reduction), using an Aminco rocking bomb hydrogenation vessel at a temperature of 145° C., the product obtained consisted of a mixture of materials indicating cleavage as well as incomplete hydrolysis reduction.

I now find, however, that polyetheralkanal acetals of the type indicated in the equation given below can readily be simultaneously hydrolyzed and reduced to corresponding polyether alcohols by carrying out the simultaneous hydrolysis reduction in an aqueous solution containing catalytic quantities of hydrolyzable metal salts of mineral and organic acids in conjunction with Raney nickel catalyst and hydrogen at moderate temperatures and pressures.

It is presumed that the acetal is first hydrolyzed to the corresponding aldehyde and this aldehyde then reduced to the corresponding alcohol. However, the aldehyde which is presumably formed as a by-product has not been isolated.

The reaction involved in the present invention may be formulated as follows (assuming that an aldehyde is formed as an intermediate).

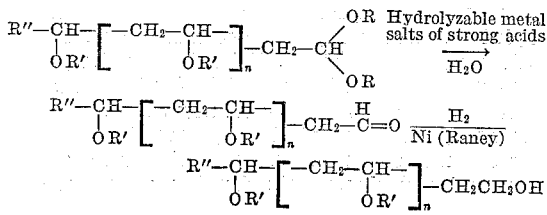

where R, R' and R'' may be the same or different and are chosen from the group consisting of alkyl, aryl, alkoxyalkyl, or aralkyl and $n$ may vary from 1 to 5 or higher.

It has been found that various hydrolyzable metal salts of zinc and nickel are particularly useful as hydrolysis catalyst and the salts of manganese, copper, cobalt and iron may also be used. It is particularly preferred to employ the nickel salts since these perform very well and it is possible to add the desired acid to the Raney nickel slurry and obtain the salt in this manner. The use of toluene sulfonic, pseudocumene sulfonic, methane sulfonic, sulfuric, hydrochloric, and trichloroacetic acids as sources of anions for the hydrolyzable salts have been shown to be of value. These hydrolyzable metal salts of strong mineral and organic acids are used as hydrolytic agents in the present invention in catalytic amounts of one mole percent and less. This facilitates markedly the working up of the products since the concentration of metal salts are at a minimum.

The reaction is preferably carried out under a pH range of 4.5 to 5.5 and, under these conditions, the corroding action on the equipment is at a minimum so that less expensive equipment may be used. In addition since catalytic amounts of hydrolyzable metal salts are used as hydrolytic agents in the process of the present invention in place of significant quantities of aqueous mineral acids which have heretofore commonly been used in the hydrolysis of acetals to aldehydes.

It has been found that difficulties normally encountered in working with aldehydes are largely avoided. Assuming that aldehydes are formed as an intermediate in the present process, they are reduced to corresponding alcohols substantially as quickly as they are formed, and difficulties due to partial decomposition etc. of the aldehydes (i. e., partial dealcoholysis under acidic conditions of polyether aldehydes, particularly under the influence of heat, to form unsaturated aldehydes and aldol condensation products) are avoided.

It has been found that the use of hydrogen pressures of the order from 600 to 1,000 pounds per square inch and temperatures within the range of 75 to 90° C. are to be preferred in practicing the present process. The uptake of hydrogen under these conditions has been satisfactorily rapid and it will be apparent that these conditions make it possible to use ordinary equipment and eliminate the need for extremely high pressure apparatus.

The details of the present invention will be apparent from the consideration of the following specific examples:

Example 1

103 parts of 3,5-dimethoxyhexanealdehyde, dimethyl acetal (prepared from vinyl methyl ether-dimethyl acetal reaction described in U. S. P. 2,165,962) was added to 36 parts of water, 2 parts of zinc paratoluenesulfonate and 5 parts of Raney nickel (calculated on a dry basis). The mixture was subjected to hydrogen at 1000 p. s. i. in a stainless steel hydrogenation vessel of the Adkins rocking-bomb type at 75–80° C. The hydrogenation was complete in 3 hours. The cooled colorless mixture was filtered and distilled at 13 mm. (mercury gauge). There was obtained 80 parts of 3,5-dimethoxy-1-hexanol; B. P. 114° C. at 13 mm. (mercury gauge); $d_4^{25}$ 0.9631; $n_D^{25}$ 1.4329. Calculated analytical figures for $C_8H_{18}O_3$ are carbon per cent 59.24, hydrogen per cent 11.18; found carbon per cent 59.44, hydrogen per cent 11.40. The yield is 98% of the theoretical.

Example 2

197 parts of 3,5-diethoxyhexanealdehyde, diethyl acetal (prepared from vinyl ethyl ether-diethyl acetal reaction described in U. S. P. 2,165,962) was added to 54 parts of water, 3 parts of nickel paratoluenesulfonate and 7.5 parts of Raney nickel (calculated on a dry basis). The mixture was subjected to hydrogen at 1000 p. s. i. in a stainless steel hydrogenation vessel of the Adkins rocking-bomb type at 75–80° C. The hydrogenation was complete in four hours. The cooled colorless mixture was filtered and distilled at reduced pressure. There was obtained 130 parts of 3,5-diethoxy-1-hexanol; B. P. 79° C. at 1.0 mm. (mercury gauge); $d_4^{25}$ 0.9273; $n_D^{25}$ 1.4308. Calculated analytical figures for $C_{10}H_{22}O_3$ are carbon per cent 63.10, hydrogen per cent 11.65; found carbon per cent 63.16, hydrogen per cent 11.76. The yield is 91% of the theoretical.

Example 3

A five gallon autoclave was charged with 2000 parts of water, 36 parts of paratoluenesulfonic acid and 180 parts of Raney nickel (calculated on a dry basis). Sufficient time was allowed for conversion of the sulfonic acid to the nickel sulfonate. There was then added 7246 parts of mixed polymethoxyaldehyde, dimethyl acetals prepared from the reaction of the vinyl methyl ether and dimethyl acetal in a ratio of 1.5:1.0, as described in U. S. P. 2,165,962. Hydrogen was admitted at a pressure of 1000 p. s. i. and maintained throughout at a temperature of 75–80° C. The reduction was complete in 3–4 hours. The cooled mixture was filtered and subjected to ion exchange through suitable cation and anion exchangers for the removal of metal salts. The removal of methanol and water was accomplished at reduced pressure. The concentrate consisted of the mixed polymethoxy-1-alcohols. The yield was 4800 parts: $n_D^{25}$ 1.4308; $d_4^{25}$ 0.9539. The percentage by weight of the alcohols present in the mixture is given below: 35% 3-methoxy-1-butanol; 30% 3,5-dimethoxy-1-hexanol; 22% 3,5,7-trimethoxy-1-octanol; 7.5% 3,5,7,9-tetramethoxy-1-decanol; 3.6% 3,5,7,9,11-pentamethoxy-1-dodecanol and 2.9% of higher alcohols.

Example 4

190 parts of 3,5,7,9,11-pentamethoxydodecanealdehyde, dimethyl acetal (prepared from vinyl methyl ether-dimethyl acetal reaction described in U. S. P. 2,165,962) was added to a mixture prepared from 36 parts of water, 1 part of paratoluenesulfonic acid and 5 parts of Raney nickel (calculated on a dry basis). The above was subjected to hydrogenation in a stainless steel bomb of the Adkins type at 1000 p. s. i. at 75–80° C. The hydrogenation was complete in four hours. The cooled filtered contents was distilled at reduced pressure. There was obtained 162 parts of 3,5,7,9,11-pentamethoxy-1-dodecanol; B. P. 150–151° C. at 0.25 mm. (mercury gauge); $d_4^{25}$ 1.0037; $n_D^{25}$ 1.4493. Calculated analytical figures for $C_{17}H_{36}O_6$ are carbon per cent 60.70, hydrogen per cent 10.79; found carbon per cent 60.51, hydrogen 10.94. The yield is 93% of the theoretical.

Example 5

198 parts of 3,5,7-trimethoxyoctanealdehyde, dimethyl acetal (prepared from vinyl methyl ether-dimethyl acetal reaction as described in U. S. P. 2,165,962) was added to 54 parts of water, 3 parts of nickel paratoluenesulfonate and 7.5 parts of Raney nickel (calculated on a dry basis). The mixture was hydrogenated at 1000 p. s. i. at 75–80° C. in a stainless steel Adkins rocking-bomb vessel in the course of 3–4 hours. The cooled filtered solution was subjected to ion exchange through suitable cation and anion resinous exchangers for the removal of metal salts. Distillation yielded 151 parts of 3,5,7-trimethoxy-1-octanol; B. P. 85–86° at 0.15 mm. (mercury gauge); $n_D^{25}$ 1.4419; $d_4^{25}$ 0.9846. Calculated analytical figures for $C_{11}H_{24}O_4$ are carbon per cent 59.96, hydrogen per cent 10.98, found carbon per cent 60.10, hydrogen per cent 11.07. The yield is 91% of the theoretical.

The thus obtained polyether alcohols are novel compounds which offer interesting possibilities in a wide variety of fields of application.

While the present process has been described in the specific examples with particular reference to the simultaneous hydrolysis and reduction of polymethoxy and polyethoxy alkanal dialkyl acetals, it will be understood that the process is operative under the same conditions with acetals of polyalkoxy alkanals in which the alkoxy groups are higher alkoxyl groups and also with polyether acetals or the compounds in which the ether groups are aryloxy, arylalkoxy, etc., i. e., with all polyethers of the type described in the above mentioned Mueller-Cunradi U. S. P. 2,165,962 and Copenhaver U. S. P. 2,487,525.

It will be apparent, however, that the properties of the polyether alcohols, which are obtained and which will hereinafter be referred to as "3,5,X" polyether alcohols to indicate that an ether group is on alternate carbon atoms of the alcohol, will vary with the nature of the ether groups. The properties of the polymethoxy and the polyethoxy alcohols, derived from "3,5,X" polymethoxy aldehyde dialkyl acetals, vinyl, methyl or ethyl ether dialkyl acetal adduct, have been particularly investigated, particularly, the properties of the "3,5,X" polymethoxy alcohols, and these compounds have been found as a class to possess the following properties.

These "3,5,X" polymethoxyalcohols are colorless liquids characterized by complete miscibility in water, organic solvents such as aliphatic alcohols, ketones, esters, glycol ethers, aromatic solvents and aliphatic petroleum ethers and naphthas. The complete miscibility in aliphatic hydrocarbons is in sharp distinction to the polyethylene glycols which are virtually insoluble in these solvents. It can be readily seen that the solvent applications of these polymethoxy alcohols are numerous. These materials may serve as effective replacements for the polyethylene glycols and lower glycols in applications where low hydroscopicity, wide solvent power and lower viscosity are of value.

These "3,5,X" polymethoxy alcohols display the interesting phenomenon of a "cloud point." That is to say the aqueous solubility of the compound is reduced on raising the temperature to the point where the solute oils out. This behavior is probably due to the tendency of these compounds to associate with water at ordinary temperatures. This property is of value in the formulation of latex modifiers. This behavior is in distinction to that of the polyethylene glycols which do not display any such "cloud point" phenomenon.

As more fully described and claimed in my copending application with J. M. Wilkinson, Serial No. 227,540, filed May 21, 1951, the "3,5,X" polymethoxyalcohols have been investigated as the basic components for automotive hydraulic brake fluids. A mixture of methoxy alcohols was employed with an average molecular weight of 150, prepared from adducts of the 1.5:1 vinyl methyl ether-dimethyl acetal reaction. In this application the interesting features are that the methoxyalcohols do not cause appreciable swelling or disintegration of rubber seals, provides the requisite lubricity and offers compatibility with other standard brake fluids.

The polymethoxyalcohols are of interest as plasticizers for gelatin in various photographic applications. The plasticization of cellulosic resins such as cellulose acetate, cellulose nitrate, etc., has also been accomplished using these materials. Of interest is the softening of various materials such as casein and glue compositions.

As more fully described and claimed in my copending applications with J. M. Wilkinson, Serial No. 227,539, filed May 21, 1951, and Serial No. 256,814, filed November 16, 1951, advantage may be taken of the presence of the terminal hydroxyl group to form esters of mono-, di- and polybasic acids such as stearic, phthalic, adipic, sebacic, phosphoric, citric, etc. The dibasic acid esters, in particular the adipates and sebacates, have been found to possess interesting plasticizing properties for polyvinyl chloride, cellulose acetate butyrate, laminating resins and other similar materials. These esters impart desirable low temperature flex properties to these resins in a fashion superior to most of the presently available commercial plasticizers. Improved milling behavior, ease of compounding, absence of bloom and good color were also observed employing some of the above esters. It is believed that the presence in the alcohol function of long carbon chains and side chain ether groups are responsible for the improved properties.

Whereas many of the individual polyalkoxy acetals obtained by fractionation of the vinyl ether-acetal reaction products have been converted to the respective alcohols, several of the projected uses of the material, i. e., hydraulic brake fluids, plasticizer alcohols etc., involve the utilization of the mixture of alcohols without separation. It has been found that the process of the present invention is of particular value in the production of mixtures of polyether alcohols by simultaneous hydrolysis and reduction of mixtures of polyetheralkanal acetals, as described in said U. S. P. 2,165,962 and U. S. P. 2,478,525, particularly when greater than equal molar amounts of vinyl ethers are used since the thus obtained polyetheralkanal acetals and the polyetheralkanols obtained therefrom by hydrolysis and reduction contain substantial amounts of products having a relatively high boiling point so that they do not readily lend themselves to purification by distillation. It has been found that by the process of the present invention, polyetheralkanols are obtained which do not require distillation but are directly obtained in a pure form; since, unlike other hydrolysis and reduction processes, colored products are not formed to any noticeable extent in the process of this invention. The products obtained by the present process also contain salts which are easily removed and which are present in very low concentrations.

While, as indicated previously, the polymethoxyalkanols, (or as termed herein the "3,5,X" polymethoxy alcohols) obtained by the process of the present invention, have been investigated quite thoroughly, the corresponding polyethoxy compounds have also been investigated and have been found to be of value in many of the same applications as the "3,5,X" polymethoxy alcohols.

In physical properties, the polymethoxy alcohols rather closely resemble the polyethylene glycol ethers and it has been found that the corresponding polyethoxy compounds rather closely resemble the propylene glycol ethers since they are somewhat less water soluble, i. e., not completely water soluble, than the corresponding polymethoxy compounds. As indicated previously, as the molecular weight of the ether groups of the poly alcohols increases, the water solubility of the compounds decreases, and it has been found that the "3,5,X" polybutoxyalkanols are quite water soluble although the corresponding "3,5,X" methoxypolyalkanols are completely water soluble.

I claim:

1. A method of producing ether alcohols of the formula

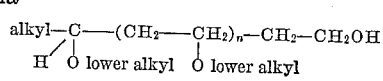

which comprises subjecting an ether acetal of the formula

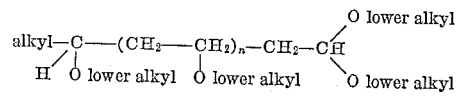

wherein $n$ is an integer including 0 to the action of hydrogen at a pressure of 600 to 1000 pounds per square inch and at a temperature of 75 to 90° C. in the presence of Raney nickel catalyst and a small amount of a water soluble hydrolyzable metal salt in aqueous medium and at a pH range of 4.5 to 5.5

2. The method as defined in claim 1 wherein the hydrolyzable metal salt is a nickel salt of a strong acid selected from the group consisting of mineral and organic acids.

3. A method of producing ether alcohols of the formula

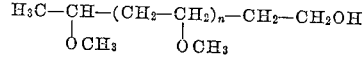

wherein $n$ is an integer including 0 which comprises subjecting an ether acetal of the formula

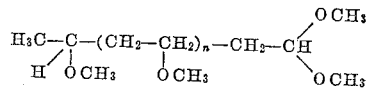

wherein $n$ is as defined above to the action of hydrogen at a pressure of 600 to 1000 pounds per square inch and at a temperature of 75 to 90° C.

in the presence of Raney nickel catalyst and a small amount of a water soluble hydrolyzable metal salt in aqueous medium and at a pH range of 4.5 to 5.5.

4. The method as defined in claim 3 wherein the hydrolyzable metal salt is a nickel salt of a strong acid selected from the group consisting of mineral and organic acids.

SAMUEL ARTHUR GLICKMAN.

REFERENCES CITED

The following references are of record in the file of this patent:

UNITED STATES PATENTS

| Number | Name | Date |
|---|---|---|
| 2,165,962 | Mueller-Cunradi et al. | July 11, 1939 |
| 2,357,479 | Loder et al. | Sept. 5, 1944 |
| 2,555,950 | Wilson | June 5, 1951 |
| 2,564,760 | Hoaglin et al. | Aug. 21, 1951 |
| 2,564,761 | Hoaglin et al. | Aug. 21, 1951 |